United States Patent
Nakakuki (10) Patent No.: US 6,674,465 B1
(45) Date of Patent: Jan. 6, 2004

(54) IMAGE PROCESSING APPARATUS WHICH DOES NOT GENERATE A FALSE SIGNAL EVEN IF UNEVENNESS OF SPECTRAL SENSITIVITIES OF THE COLOR FILTER OCCURS

(75) Inventor: Toshio Nakakuki, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/448,028

(22) Filed: Nov. 23, 1999

(30) Foreign Application Priority Data

Nov. 25, 1998 (JP) .......................... 10-334177

(51) Int. Cl.[7] .................. H04N 5/228; H04N 9/73; H04N 9/67; H04N 9/64
(52) U.S. Cl. ................. 348/222.1; 348/223.1; 348/655; 348/659; 348/661; 348/29
(58) Field of Search ................ 348/222.1, 659, 348/661, 29, 223.1, 655

(56) References Cited

U.S. PATENT DOCUMENTS

| | | | | |
|---|---|---|---|---|
| 4,926,247 A | * | 5/1990 | Nagasaki et al. | 348/262 |
| 5,130,786 A | * | 7/1992 | Murata et al. | 375/240.25 |
| 5,150,206 A | * | 9/1992 | Roberts | 348/661 |
| 6,275,261 B1 | * | 8/2001 | Yamazaki | 348/273 |
| 6,373,532 B1 | * | 4/2002 | Nakakuki | 348/659 |

* cited by examiner

*Primary Examiner*—Wendy R. Garber
*Assistant Examiner*—James Hannett
(74) *Attorney, Agent, or Firm*—Sheridan Ross PC

(57) ABSTRACT

An apparatus for processing image data including three complementary color components representing the three primary colors includes a distribution circuit for distributing the image data into first to third complementary color components. A multiplication circuit generates first to third products by multiplying the first and second complementary color components, the first and third complementary color components, and the second and third complementary color components. A square root circuit then calculates the square root of each of the three products. The calculated square roots represent the three primary colors.

5 Claims, 6 Drawing Sheets

| G | Mg | G | Mg |
|---|---|---|---|
| Cy | Ye | Cy | Ye |
| G | Mg | G | Mg |
| Cy | Ye | Cy | Ye |

Fig.10

IMAGE PROCESSING APPARATUS WHICH DOES NOT GENERATE A FALSE SIGNAL EVEN IF UNEVENNESS OF SPECTRAL SENSITIVITIES OF THE COLOR FILTER OCCURS

BACKGROUND OF THE INVENTION

The present invention relates to a method and an apparatus for processing image data, and, more particularly, to an image data processing method which generates primary color data representing primary color components from complementary color data representing complementary color components.

Figure 1:
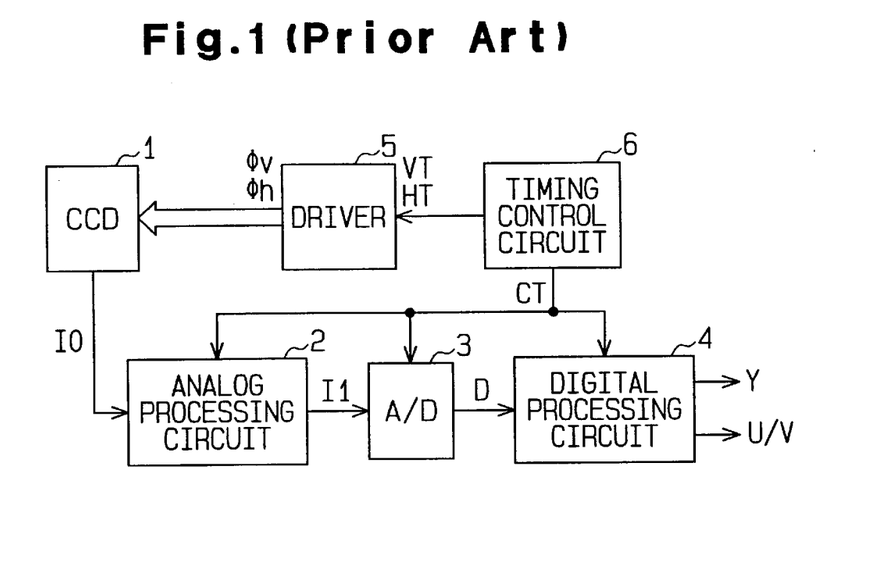
FIG. 1 is a schematic block diagram showing the configuration of a conventional solid-state image sensor.
Figure 2:
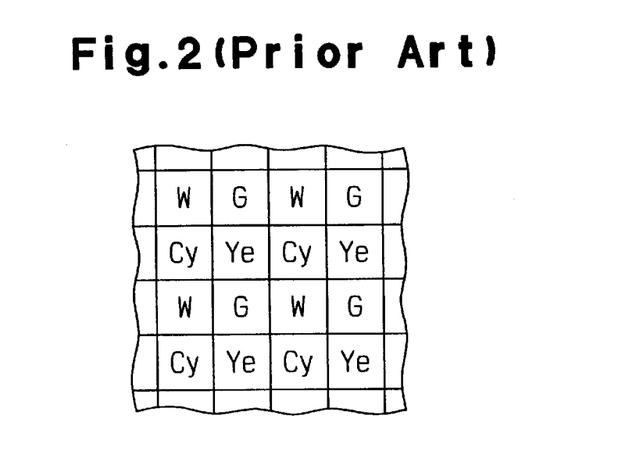
FIG. 2 is a configuration diagram showing an example of a conventional mosaic type color filter.

FIG. 1 is a block diagram showing the configuration of a prior art image sensing device 100 which uses a CCD image sensor 1, and FIG. 2 is a plane view showing an example of a mosaic color filter attached to the CCD image sensor 1.

The CCD image sensor 1 has a plurality of light-receiving pixels, a plurality of vertical shift registers and usually a horizontal shift register. The light-receiving pixels are arranged in a matrix form on the light-receiving surface at regular intervals and produce and store information charges corresponding to the image of each sensed object. The vertical shift registers are arranged to correspond to the columns of the light-receiving pixels and sequentially shift the information charges stored in the light-receiving pixels, in the vertical direction. The horizontal shift register is arranged on the output side of the vertical shift registers and receives the information charges output from the vertical shift registers, and then transfers the information charges row by row. This allows the horizontal shift register to output an image signal I0 which changes a voltage value in accordance with the information charges stored in the light-receiving pixels.

An analog processing circuit 2 performs a process, such as sampling and holding or level clamping, on the image signal I0 input from the CCD image sensor 1 to produce an image signal I1 which conforms to a predetermined format. For example, in the sample and hold process, only an image signal having a certain signal level is extracted from the image signal I0 having reset levels and signal levels which are alternately repeated in synchronism with the output operation of the CCD image sensor 1. In the level clamping process, the black reference level set at the end of the horizontal scanning period of the image signal I0 is clamped to a predetermined level every horizontal scanning period. An A/D conversion circuit 3 quantizes the image signal I1 received from the analog processing circuit 2 in synchronism with the operation of the analog processing circuit 2, i.e., the output operation of the CCD image sensor 1, to generate image data D which represents the information with a digital value corresponding to each light-receiving pixel of the CCD image sensor 1.

A digital processing circuit 4 performs a process, such as color distribution or a matrix operation, on the image data D received from the A/D conversion circuit 3 and generates luminance data Y and color difference data U and V. For example, in the color distribution process, the image data D is separated in accordance with the color arrangement of a color filter attached to each light-receiving surface of the CCD image sensor 1, generating a plurality of color component data. Further, in the matrix operation process, primary color data corresponding to the three primary colors of light are generated from the individually separated color component data, and are then combined at a predetermined ratio, thereby generating the color difference data.

A driver 5 responds to various timing signals from a timing control circuit 6 and supplies a multi-phase drive clock to each shift register of the CCD image sensor 1. For example, a 4-phase vertical transfer clock φv is supplied to the vertical shift registers, and a 2-phase horizontal transfer clock φh is supplied to the horizontal shift register. In accordance with a reference clock having a given period, the timing control circuit 6 produces a vertical timing signal, which determines the vertical scan timing of the CCD image sensor 1, and a horizontal timing signal, which determines the horizontal scan timing, and supplies the timing signals to the driver 5. At the same time, the timing control circuit 6 supplies a timing clock CT for synchronizing the operation of each circuit 2, 3, 4 with the output operation to the analog processing circuit 2, the A/D conversion circuit 3 and the digital processing circuit 4.

In performing color image sensing, attaching a color filter for color distribution to the light-receiving surface allows the individual light-receiving pixels of the CCD 1 to be associated with predetermined color components. A stripe type color filter has a plurality of segments each of which is connected in the vertical direction and a mosaic type color filter which has a plurality of segments associated with every light-receiving pixel. For example, the mosaic type color filter, as shown in FIG. 2, is split into a plurality of segments corresponding to each pixel of the light-receiving section of the CCD image sensor 1 and color components of Ye (yellow), Cy (cyan), W (white) and G (green) are cyclically assigned to each segment. In the example of FIG. 2, the W and G components are alternately arranged in odd rows and the Ye and Cy components are alternately arranged in even rows. For an image signal obtained from the CCD image sensor 1 to which such color filter is attached, the W and G components are repeated when reading even rows and the Ye and Cy components are repeated when reading odd rows.

Figure 3:
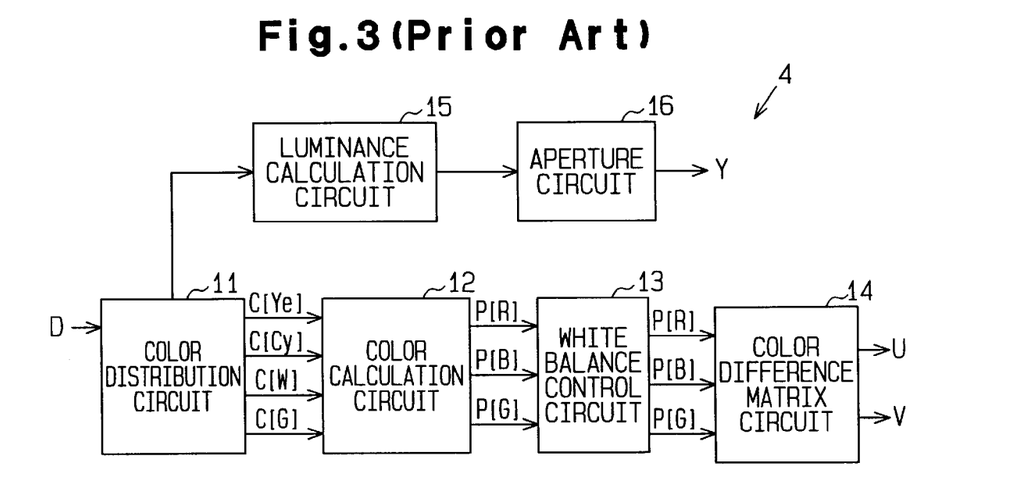
FIG. 3 is a schematic block diagram showing the configuration of a conventional image data processing apparatus.
Figure 4:
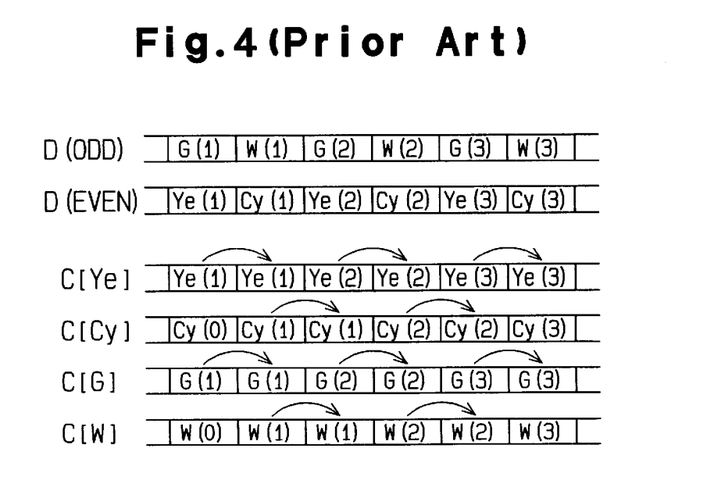
FIG. 4 is a timing chart for describing the operation of the conventional image data processing apparatus of FIG. 3.

FIG. 3 is a block diagram showing the configuration of the digital signal processing section 4, and FIG. 4 is a timing diagram for describing the operation of the processing section 4. FIG. 4 corresponds to the case where the mosaic type color filter shown in FIG. 2 is attached to the CCD 1.

A color distribution circuit 11 separates the image data D in which each color component continues in the arrangement order of each segment of the color filter. The distribution circuit 11 then generates color component data C[Ye], C[Cy], C[G] and C[W]. For the image data D input from the A/D conversion circuit 3, as shown in FIG. 4, the G and W components continue alternately in an operation of reading odd rows (ODD) and the Ye and Cy components continue alternately in an operation of reading even rows (EVEN). Accordingly, the color distribution circuit 11 retains at least one row of the image data D to allow the output of all the color component data C[Ye], C[Cy], C[G] and C[W] at the time of reading each row. Specifically, during reading of an odd row, the color distribution circuit 11 separates the image data D for the odd row and outputs the color component data C[G] and C[W]. At the same time, the color distribution circuit 11 separates the image data D for the previously read even row and outputs the color component data C[Ye] and C[Cy]. Further, this scheme causes the color component data C[Ye], C[Cy], C[G] and C[W] to be output intermittently at the time of outputting the image data D serially. The intermittent portions of the color component data are however interpolated by outputting the same color component data twice in succession.

A color calculation circuit 12 performs a color computation process according to, for example, the following equations on the color component data C[Ye], C[Cy], C[G] and C[W] input from the color distribution circuit 11, to generate primary color data P[R], P[G] and P[B] corresponding to the three primary colors (R: red, G: green and B: blue) of light.

$$Ye-G=R$$

$$Cy-G=B$$

$$G=G$$

A white balance control circuit 13 assigns specific gains set to each of the primary color data P[R], P[G] and P[B] input from the color calculation circuit 12 to adjust the balance of each color. In other words, in the white balance control circuit 13, because this adjustment compensates for differences in the sensitivities of the light-receiving pixels of the CCD image sensor which depend on each color component, the gains of the primary color data P[R], P[G] and P[B] are individually set to improve the color reproduction of a reproduced image.

A color difference matrix circuit 14 generates color difference data U and V from the primary color data P[R], P[G] and P[B] input from the white balance control circuit 13. The color difference matrix circuit 14 combines the respective primary color data P[R], P[G] and P[B] at a ratio of 3:6:1 to generate luminance information. Then, the color difference matrix circuit 14 subtracts the luminance information from the primary color data P[B] corresponding to the B component to generate the color difference data U. Further, the color difference matrix circuit 14 subtracts the luminance information from the primary color data P[R] corresponding to the R component to generate the color difference data V.

A luminance calculation circuit 15 combines the four color components included in the image data D provided to the color distribution circuit 11 to generate the luminance data Y. That is, assume each component of Ye, Cy, G and W is combined. It can be seen that $$Ye+Cy+G+W=(B+G)+(R+G)+G+(R+G+B)=2R+4G+2B$$

This allows the luminance data Y in which the R, G and B components are combined at a ratio of 1:2:1 to be obtained. While a luminance signal is produced by combining the R, G and B components at a ratio of 3:6:1 according to the NTSC standards, the luminance signal produced by combining the components at a ratio close to this ratio does not cause a practical problem.

An aperture circuit 16 enhances a specific frequency component included in the luminance data Y to generate aperture data, and adds the aperture data Y to the luminance data Y. In other words, to enhance the outline of the image of a sensed object, the aperture circuit 16 performs a filtering process on the image data D to generate aperture data so that the frequency component of one fourth the sampling frequency, which is used to obtain the image data D from the image signal Y, is enhanced. The luminance data Y generated in this manner is supplied to an external display device or recording device together with the color difference data U and V.

Because the R and B components are generated in the color computation process by the color calculation circuit 12 by subtracting the G component from the Ye and Cy components, respectively, the R or B component may show a negative value according to the unevenness of spectral characteristics of the color filter. For example, for light in which the G component is strong and the R or B component is weak, the Ye or Cy component has a slightly higher value than the G component and the R or B component should show a positive value close to "0". However, if the Ye or Cy filter is not be transparent to desired light and the Ye or Cy component can be obtained only by a lower value than the G component, the R or B component has a negative value as a result of the color computation process. Such negative value cannot be originally obtained as a color component, and produces a false signal, thereby causing the image quality of the reproduced image to deteriorate.

SUMMARY OF THE INVENTION

It is an object of the present invention to provide an image signal processing apparatus which does not generate a false signal even if unevenness of spectral sensitivities of the color filter occurs.

In one aspect of the present invention, a method is provided that processes first to third complementary color data representing complementary colors of the three primary colors of light and produces first to third primary color data representing the three primary colors of light. The method includes the steps of multiplying said first complementary color data and said second complementary color data to generate a first product, multiplying said first complementary color data and said third complementary color data to generate a second product, multiplying said second complementary color data and said third complementary color data to generate a third product, calculating a square root of the first product to produce a first root as the first primary color data, calculating a square root of the second product to produce a second root as the second primary color data, and calculating a square root of the third product to produce a third root as the third primary color data.

In another aspect of the present invention, an apparatus is provided that processes image data comprising first to third complementary color data representing complementary colors for the three primary colors of light and generates first to third primary color data representing the three primary colors of light. The apparatus includes a distribution circuit for distributing said image data into the first to third complementary color data. A multiplication circuit multiplies the first and second complementary color data to produce a first product, the second and third complementary color data to produce a second product, and the first and third complementary color data to produce a third product. An extraction circuit extracts square roots of said first to third products and produces first to third roots as said first to third primary color data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 5:
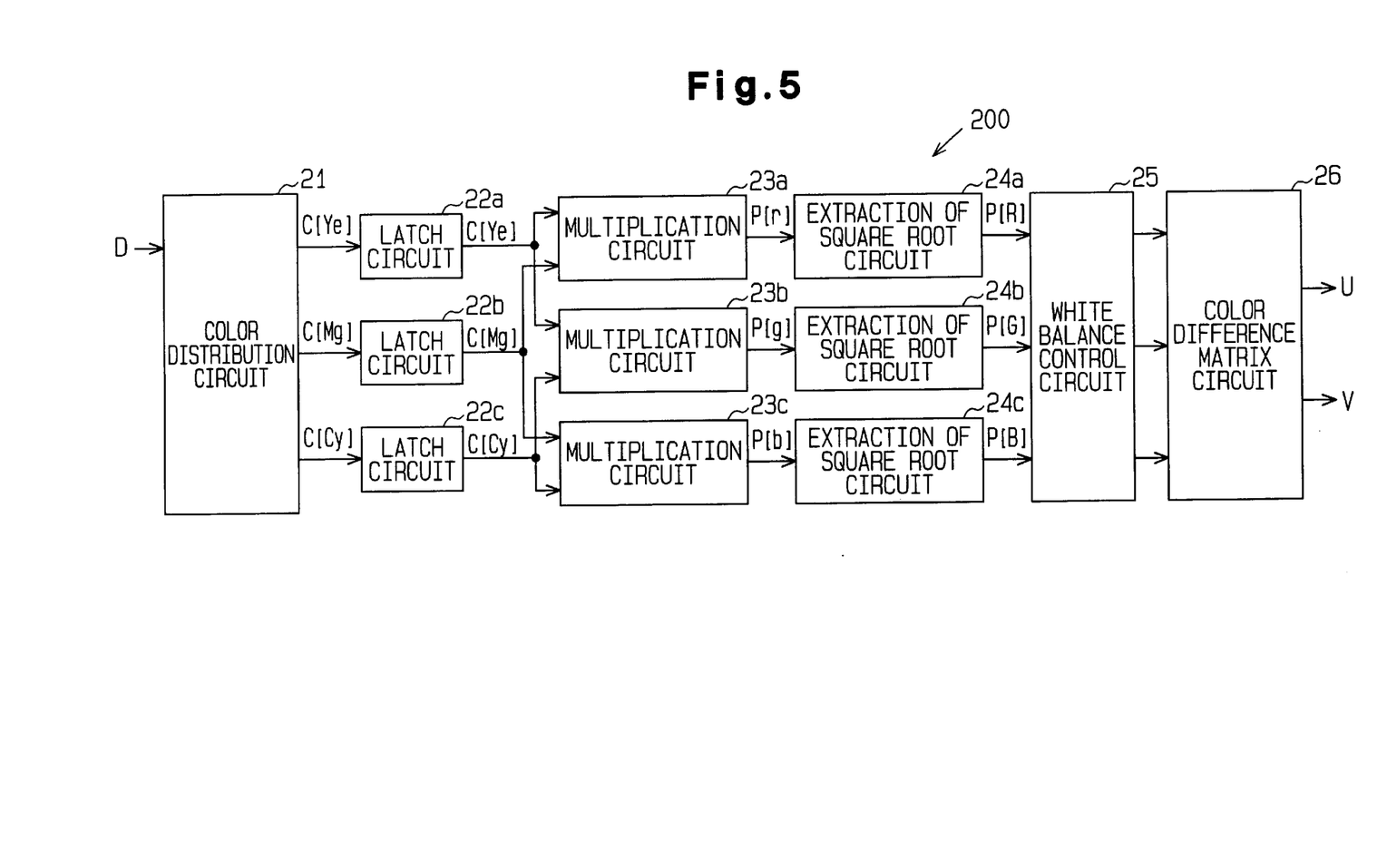
FIG. 5 is a block diagram showing the configuration of an image data processing apparatus of the present invention.
Figure 6:
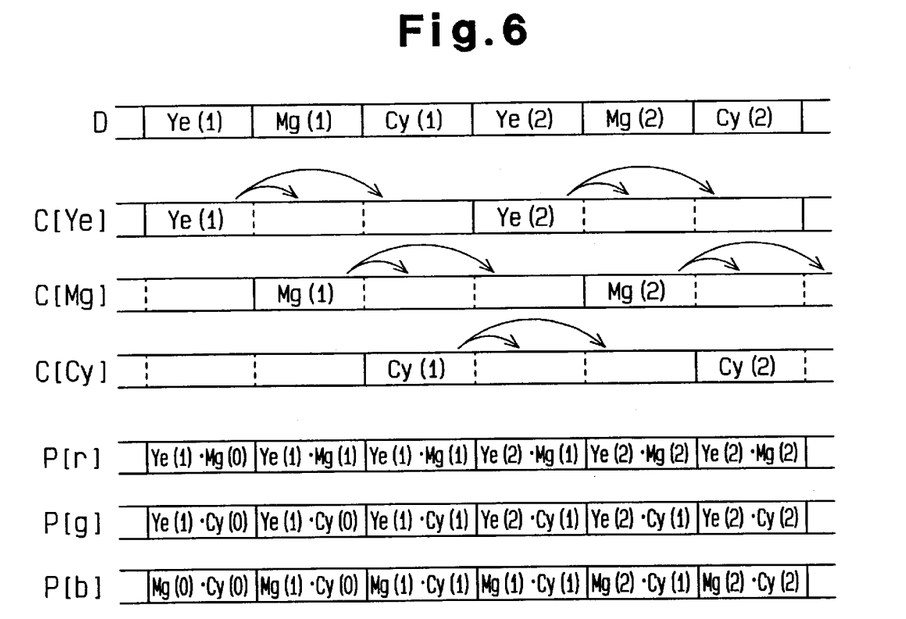
FIG. 6 is a timing chart for describing the operation of an image data processing apparatus of FIG. 5.

FIG. 5 is a block diagram showing the configuration of an image data processing apparatus 200 of the present invention, and FIG. 6 is a timing chart for describing the operation of the apparatus 200. It is assumed in this case that the image data D input to the apparatus 200, for example, is obtained from an image sensor to which a stripe type color filter is attached. The stripe type color filter comprises the complementary colors (Ye: yellow, Mg: magenta and Cy: cyan) and the image data D repeats the three complementary color components.

A color distribution circuit 21 separates the image data D, which is input per pixel, for every color component and generates complementary color data C[Ye], C[Mg] and C[Cy] corresponding to Ye, Mg and Cy. In other words, for the image data D, because each complementary color component, for example, is repeated per pixel in the order of Ye, Mg and Cy, the complementary color data C[Ye], C[Mg] and C[Cy] representing the complementary color components are generated by distributing the image data D into three parts in a given order. First to third latch circuits 22a to 22c are connected in parallel to the color distribution circuit 21 and latch the complementary color data C[Ye], C[Mg] and C[Cy] provided by the color distribution circuit 21, respectively and then repeatedly output the latched data until the next data is provided from the color distribution circuit 21. Since each of the complementary color data C[Ye], C[Mg] and C[Cy] is one third the image data D and the image data D is updated once every three pixels, three consecutive pixels are represented using the same data.

A first multiplication circuit 23a is connected to the first and second latch circuits 22a and 22b and multiplies the complementary color data C[Ye] and C[Mg] from the respective latch circuits 22a and 22b to produce a first product P[r]. A second multiplication circuit 23b is connected to the first and third latch circuits 22a and 22c and multiplies the complementary color data C[Ye] and C[Cy] from the respective latch circuits 22a and 22c to produce a second product P[g]. A third multiplication circuit 23c is connected to the second and third latch circuits 22b and 22cand multiplies the complementary color data C[Mg] and C[Cy] from the respective latch circuits 22b and 22c to produce a third product P[b]. First to third extraction circuits 24a to 24c are connected to the first to third multiplication circuits 23a to 23c, respectively and calculate the square roots of the first to third products P[r], P[g] and P[b] from the respective multiplication circuits 23a to 23c to generate first to third roots P[R], P[G] and P[B]. These first to third roots P[R], P[G] and P[B] are supplied to a white balance control circuit 25 as primary color data corresponding to the three primary colors of light.

The white balance control circuit 25 assigns specific gains to the primary color data P[R], P[B] and P[G] from the first to third extraction circuits 24a to 24c and adjusts the balance of each color to reproduce a white sensed object in the same manner as on the reproduced image. Further, a color difference matrix circuit 26 receives the gain adjusted primary color data P[R], P[B] and P[G] from the white balance control circuit 25 and generates the color difference data U and V. The white balance control circuit 25 and the color difference matrix circuit 26 are the same as the white balance control circuit 13 and the color difference matrix circuit 14 shown in FIG. 3.

A method of processing image data according to the present invention now will be described.

Figure 7:
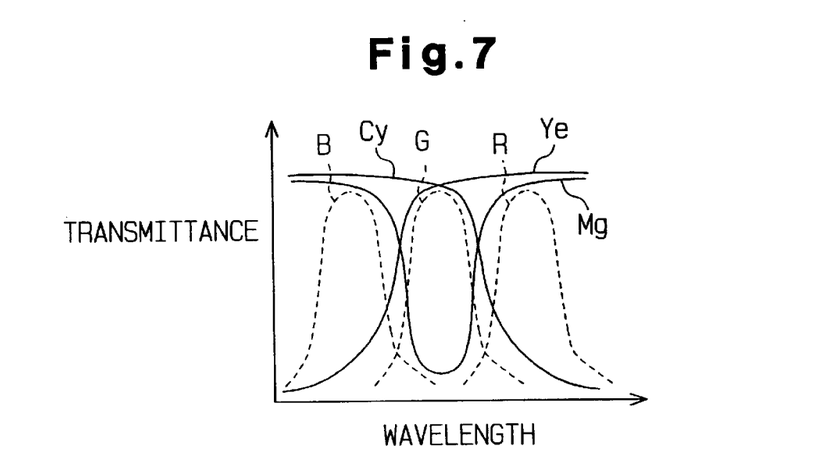
FIG. 7 is a diagram showing spectral characteristics of a color filter.
Figure 8A:
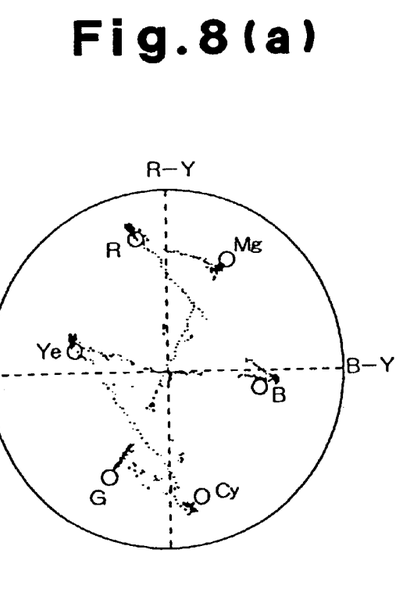
FIGS. 8(a) and 8(b) are a color vector diagrams obtained by measuring an image signal corresponding to a color bar.
Figure 8B:
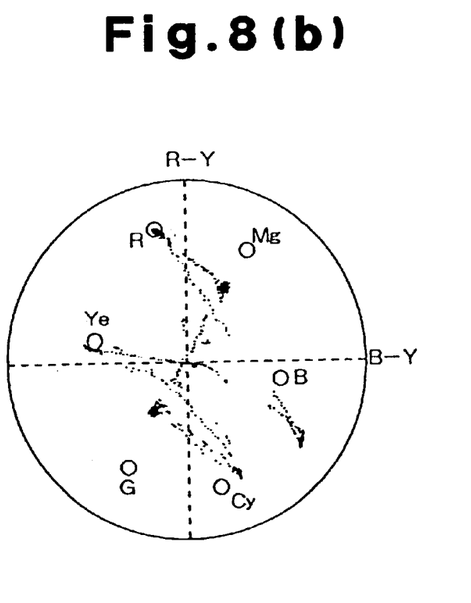

FIG. 7 is a diagram showing spectral characteristics of a color filter associated with the three primary colors of light and their complementary colors. FIGS. 8(a) and (b) are color vector diagrams (measured values) of each color component reproduced by the image data processing method of the present invention.

In general, color filters corresponding to the three primary colors (R: red, G: green and B: blue) of light represent spectral characteristics shown by the dashed lines of FIG. 7. The R filter shows the maximal value of transmittance in the portion which corresponds to the red light having long wavelengths and lowers the transmittance against the light having shorter wavelengths than red. Conversely, the B filter shows the maximal value of transmittance in the portion which corresponds to the blue light having short wavelengths and lowers the transmittance against the light having longer wavelengths than blue. The G filter shows the intermediate characteristics between the R filter and the G filter.

In contrast, filters corresponding to the complementary colors (Ye, Mg and Cy) of R, G and B show spectral characteristics as shown by the solid lines of FIG. 7. That is, the Cy filter which is the complementary color of R shows characteristics contrary to the R filter and increases the transmittance on the short wavelength side excluding the portion which corresponds to red light. The Ye filter which is the complementary color of B shows characteristics contrary to the B filter and increases the transmittance on the long wavelength side excluding the portion which corresponds to blue light. The Mg filter which is the complementary color of G increases the transmittance excluding the portion which corresponds to green light.

In the present invention, the Ye component obtained according to the light passing through the Ye filter and the Mg component obtained according to the light passing through the Mg filter are multiplied. The R component included in both components is enhanced and the B and G components included in only one component are attenuated. Similarly, by multiplying the Mg component obtained according to the light passing through the Mg filter and the Cy component obtained according to the light passing through the Cy filter, the B component included in both components and the G and R components included in only one component are attenuated. Further, by multiplying the Cy component obtained according to the light passing through the Cy filter and the Ye component obtained according to the light passing through the Ye filter, the G component included in both components is enhanced and the R and B components included in only one component are attenuated. The product of each complementary component obtained in this manner corresponds to a specific primary color component, and is represented as a square multiple against practical primary color components due to the multiplication of complementary components. Then, by extracting the square root of each product, each primary color component is approximately be represented.

Accordingly, as shown in FIG. 8(a), a color vector is obtained by measuring an image signal generated by applying the aforementioned processing method to an output signal. The output signal is obtained by sensing the image of a color bar including the three primary colors (R, G and B) of light and their complementary colors (Ye, Mg and Cy), using an image sensor to which a complementary system color filter is attached. FIG. 8(b) shows the color vector obtained by measuring an image signal, which is generated by applying a conventional processing method of FIG. 3, to an output signal obtained by imaging the same color bar. In FIGS. 8 (a) and (b), the horizontal axis (X-axis) indicates B-Y (U) and the vertical axis (Y-axis) indicates R-Y (V) and the six circles shown in FIGS. 8(a) and (b) indicate the ideal positions of primary and complementary colors. A comparison of FIGS. 8(a) and 8(b) confirms that the image signal using a processing method of the present invention is collected in the ideal positions of each color component FIG. 8(a)).

In contrast with the prior art, a subtraction process is not used in the above processing method, so a negative value is not produced in the color computation process, even if unevenness occurs in the spectral characteristics of each color filter.

Figure 9:
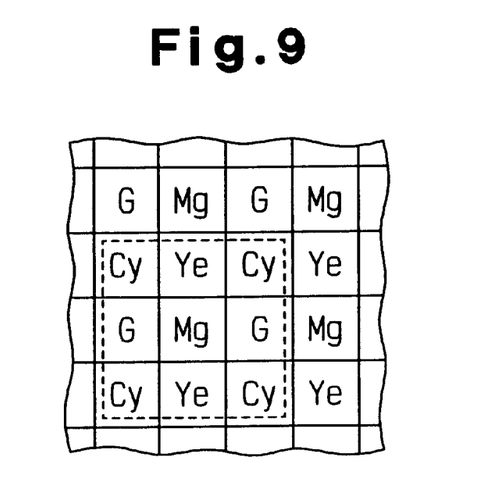
FIG. 9 is a configuration diagram showing an example of a mosaic typo color filter.
Figure 10:
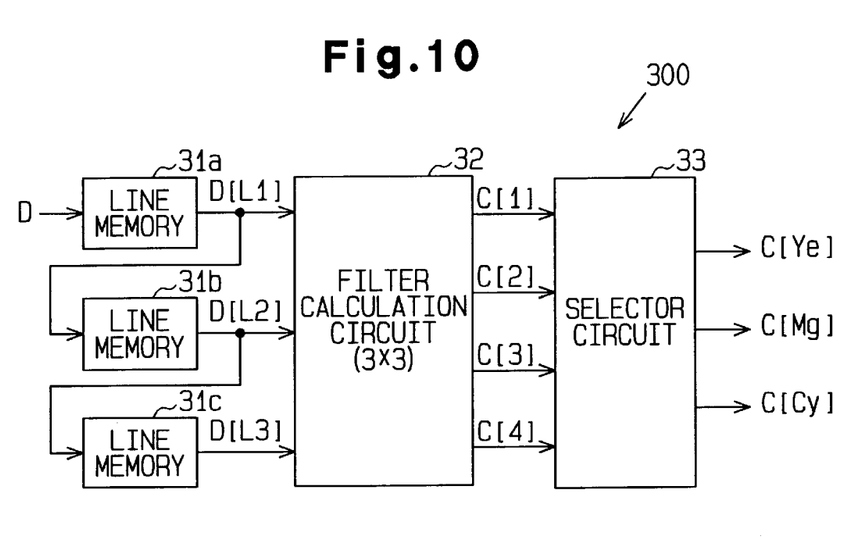
FIG. 10 is a block diagram showing the configuration of a color distribution section of the image data processing apparatus of FIG. 5 corresponding to the mosaic type color filter of FIG. 9.

FIG. 9 is a plane view showing the configuration of a mosaic type color filter which is suitable for use in the processing method of the present invention. FIG. 10 is a schematic block diagram showing the configuration of a distribution section 300 which separates the image signal, obtained from an image sensor to which the color filter is attached, into the complementary color components. The distribution section 300, in the processing apparatus shown in FIG. 5, replaces the color distribution circuit 21 and the first to third latch circuits 22a to 22c.

Referring to FIG. 9, the color filter has segments each corresponding to each component of Ye, Mg, Cy and G. The Mg and G components are alternately arranged in odd rows and the Ye and Cy components are arranged alternately in even rows. Then, each component of Ye, Mg and Cy is used for producing color information and luminance information and the G component is used only for producing the luminance information. In an image sensor to which such color filter is attached, the Mg and G components continue alternately in an image signal generated from the odd rows and the Ye and Cy components continue alternately in the image signal generated from the even rows.

Referring to FIG. 10, the distribution section 300 comprises first to third line memories 31a to 31c, a filter calculation circuit 32 and a selector circuit 33. The first to third line memories 31a to 31c are connected in series and store three rows of image data. The first to third line memories 31a to 31c receive the image data D[L1], D[L2] and D[L3] of each row at the same time and supply them to the filter calculation circuit 32.

The filter calculation circuit 32 retains three columns of the image data D[L1], D[L2] and D[L3] from the first to third line memories 31a to 31c and generates the color component data C[1], C[2], C[3] and C[4] corresponding to each segment of the color filter by the filter computation every three rows multiplied by three columns. For example, in FIG. 9, the center pixel is specified as a target pixel for the nine pixels enclosed within the dashed lines and the Mg component of the target pixel is output as the color component data C[1]. Further, from the two pixels of the G component located on the right and left of the target pixel, their mean value is output as the color component data C[2] and from the two pixels of the Ye component located above and below the target pixel, their mean value is output as the color component data C[3]. Furthermore, for the four pixels of the Cy component located at the four corners, their mean value is output as the color component data C[4]. The interrelationship between such color component data C[1], C[2], C[3] and C[4] and color components Ye, Mg, Cy and G are switched every time the target is shifted.

The selector circuit 33 selects the color component data C[1], C[2], C[3] and C[4] representing each component of Ye, Mg and Cy and outputs the selected data as the complementary color data C[Ye], C[Mg] and C[Cy]. This selection operation switches four patterns in accordance with the color component of the target pixel. Accordingly, in the same manner as the first to third latch circuits 22a to 22c shown in FIG. 5, the selector circuit 33 provides three types of complementary color data C[Ye], C[Mg] and C[Cy] to the first to third multiplication circuits 23a to 23c of FIG. 5 without missing in all periods. By using the distribution section 300, a mosaic type color filter can be used with the processing apparatus of the present invention.

It should be apparent to those skilled in the art that the present invention may be embodied in many other specific forms without departing from the spirit or scope of the invention. Particularly, it should be understood that the invention may be embodied in the following forms.

In the above embodiments, although a CCD image sensor is illustrated, a MOS sensor can also be used as the image sensor. Further, if at least three types of complementary colors (Ye, Mg and Cy) are provided as a color filter, they can apply and also be combined with other color components.

Therefore, the present examples and embodiment are to be considered as illustrative and not restrictive and the invention is not to be limited to the details given herein, but may be modified within the scope and equivalence of the appended claims.

What is claimed is:

1. A method for processing first to third complementary color data representing complementary colors of the three primary colors of light and producing first to third primary color data representing the three primary colors of light, comprising the steps of:

multiplying said first complementary color data and said second complementary color data to generate a first product;

multiplying said first complementary color data and said third complementary color data to generate a second product;

multiplying said second complementary color data and said third complementary color data to generate a third product;

calculating a square root of the first product to produce a first root as the first primary color data;

calculating a square root of the second product to produce a second root as the second primary color data; and calculating a square root of the third product to produce a third root as the third primary color data.

2. The method of claim 1, wherein said first, second and third complementary color data represent yellow, magenta and cyan, respectively and the first, second and third primary color data represents red, green and blue, respectively.

3. An apparatus for processing image data comprising first to third complementary color data representing complementary colors for the three primary colors of light and generating first to third primary color data representing the three primary colors of light, comprising:
- a distribution circuit for distributing said image data into the first to third complementary color data;
- a multiplication circuit for multiplying the first and second complementary color data to produce a first product, the second and third complementary color data to produce a second product, and the first and third complementary color data to produce a third product; and
- an extraction circuit, connected to the multiplication circuit, for extracting square roots of said first to third products and producing first to third roots as said first to third primary color data.

4. The apparatus of claim 3, wherein said distribution circuit includes a filter circuit which retains the first to third complementary color data for a predetermined period and repeatedly outputs and interpolates the first to third complementary color data when one of the first to third complementary color data is missing.

5. The apparatus of claim 4, further comprising a matrix circuit for combining the first to third roots at a predetermined ratio and generating first and second color difference data using the first to third roots as first to third primary color data representing three primary colors of light.

* * * * *